United States Patent
Hoshino et al.

(10) Patent No.: US 8,285,304 B2
(45) Date of Patent: Oct. 9, 2012

(54) RADIO COMMUNICATION SYSTEM AND POSITION INFORMATION PROVIDING APPARATUS

(75) Inventors: Jin Hoshino, Ota-ku (JP); Susumu Ogata, Yokohama (JP); Masatoshi Kimoto, Yokosuka (JP)

(73) Assignee: NTT DoCoMo, Inc., Tokyo (JP)

( * ) Notice: Subject to any disclaimer, the term of this patent is extended or adjusted under 35 U.S.C. 154(b) by 298 days.

(21) Appl. No.: 12/669,853

(22) PCT Filed: Jul. 18, 2008

(86) PCT No.: PCT/JP2008/063045
§ 371 (c)(1),
(2), (4) Date: Apr. 14, 2010

(87) PCT Pub. No.: WO2009/014096
PCT Pub. Date: Jan. 29, 2009

(65) Prior Publication Data
US 2010/0210283 A1    Aug. 19, 2010

(30) Foreign Application Priority Data
Jul. 20, 2007  (JP) .................... 2007-189841

(51) Int. Cl.
*H04W 24/00* (2009.01)
(52) U.S. Cl. ............. 455/456.1; 455/456.3; 455/404.2; 455/414.1; 455/422.1
(58) Field of Classification Search .......... 455/456.1, 455/456.3, 404.2, 414.1, 422.1
See application file for complete search history.

(56) References Cited

U.S. PATENT DOCUMENTS
7,398,092 B2 * 7/2008 An ........................ 455/456.1

| | | |
|---|---|---|
| 2004/0258012 A1 | 12/2004 | Ishii |
| 2007/0063897 A1 | 3/2007 | Matsuda |
| 2007/0109186 A1 | 5/2007 | Fujiwara et al. |

FOREIGN PATENT DOCUMENTS

| | | |
|---|---|---|
| EP | 1 480 483 A2 | 11/2004 |
| JP | 2003 185727 | 7/2003 |
| JP | 2006 23267 | 1/2006 |
| WO | 2005 012939 | 2/2005 |
| WO | 2006 006530 | 1/2006 |

OTHER PUBLICATIONS

Extended Search Report issued Jun. 30, 2011 in European Patent Application No. 08791354.7-2220 / 2172786.

* cited by examiner

*Primary Examiner* — Nghi H Ly
(74) *Attorney, Agent, or Firm* — Oblon, Spivak, McClelland, Maier & Neustadt, L.L.P.

(57) ABSTRACT

A radio communication system includes a delay time acquiring unit configured to acquire a delay time of a signal transmitted between the mobile terminal 10 and the base station 20; a position information acquiring unit configured to acquire a position of the base station 20; a calculating unit configured to calculate a position of the mobile terminal 10 on the basis of the delay time acquired by the delay time acquiring unit, and the position of the base station 20 acquired by the position information acquiring unit; and a providing unit configured to provide mobile station position information indicating the position of the mobile terminal 10. When a predetermined exception condition is not satisfied, the providing unit provides, as the mobile station position information, the position of the mobile terminal 10 calculated by the calculating unit. When the predetermined exception condition is satisfied, the providing unit provides, as the mobile station position information, the position of the base station 20 acquired by the position information acquiring unit, instead of using the position of the mobile terminal 10 calculated by the calculating unit.

12 Claims, 12 Drawing Sheets

| BASE STATION ID | EXCEPTION FLAG | ANTENNA DIRECTIVITY ANGLE | BASE STATION LATITUDE | BASE STATION LONGITUDE | INSTALLED LOCATION |
|---|---|---|---|---|---|
| 1 | 0 | 30 DEGREES | N12.34.56 | E123.45.06 | SUBURB |
| 2 | 0 | 90 DEGREES | N23.45.06 | E124.56.07 | SUBURB |
| 3 | 1 | — | N21.43.65 | E122.54.60 | SUBURB |
| 4 | 1 | 60 DEGREES | N32.54.60 | E121.65.70 | CITY |
| ... | ... | ... | ... | ... | ... |

| BASE STATION ID | EXCEPTION FLAG | ANTENNA DIRECTIVITY ANGLE | BASE STATION LATITUDE | BASE STATION LONGITUDE | INSTALLED LOCATION | PRIORITY |
|---|---|---|---|---|---|---|
| 1 | 0 | 30 DEGREES | N12.34.56 | E123.45.06 | SUBURB | MEDIUM |
| 2 | 0 | 90 DEGREES | N23.45.06 | E124.56.07 | SUBURB | LOW |
| 3 | 1 | — | N21.43.65 | E122.54.60 | SUBURB | LOW |
| 4 | 1 | 60 DEGREES | N32.54.60 | E121.65.70 | CITY | HIGH |
| ... | ... | ... | ... | ... | ... | ... |

RADIO COMMUNICATION SYSTEM AND POSITION INFORMATION PROVIDING APPARATUS

TECHNICAL FIELD

The present invention relates to a radio communication system including a mobile terminal and a base station that performs radio communication with the mobile terminal, and relates to a position information providing apparatus configured to provide mobile station position information indicating a position of a mobile terminal.

BACKGROUND ART

Conventionally, there has been known a radio communication system including a mobile terminal and a base station that performs radio communication with the mobile terminal. In such a radio communication system, a geographical position of the mobile terminal changes since the mobile terminal moves inside a cover area (cell or sector) covered by the base station. In response to this, there has been proposed a method of estimating a position of a mobile terminal (for example, Japanese Patent Publication No. 2006-23267 (For example, Paragraphs 0086 to 0091)).

Specifically, the mobile terminal estimates a distance and an angle between the base station and the mobile terminal in axes of coordinates on the basis of multipath delay wave received from the base station, the coordinates having origin at the base station. Subsequently, the mobile terminal estimates a coordinate point (a geographical position) of the mobile terminal on the basis of a coordinate point (a geographical position) of the base station, the estimated distance and the estimated angle.

DISCLOSURE OF THE INVENTION

In the following cases, however, accuracy of estimating a position of a mobile terminal is occasionally degraded if the mobile terminal estimates the position of the mobile terminal, as in the above-described conventional technology, on the basis of a signal received from a base station.

Specifically, examples of such cases include: (1) a case where the mobile terminal is connected to a base station, such as a base station placed indoors, whose cover area (cell or sector) is small; and (2) a case where the mobile terminal is connected to a base station whose cover area (cell or sector) partly includes an area, such as a location at sea, where a mobile terminal may not exist.

Consequently, the present invention has been made to solve the above-described problem, and an object thereof is to provide a radio communication system and a position information providing apparatus that are able to enhance accuracy of estimating a position of a mobile terminal.

In an aspect of the present invention, a radio communication system includes a mobile terminal, and a base station that performs radio communication with the mobile terminal. The radio communication system includes a delay time acquiring unit configured to acquire a delay time of a signal transmitted between the mobile terminal and the base station; a position information acquiring unit configured to acquire a position of the base station; a calculating unit configured to calculate a position of the mobile terminal on the basis of the delay time acquired by the delay time acquiring unit, and the position of the base station acquired by the position information acquiring unit; and a providing unit configured to provide mobile station position information indicating the position of the mobile terminal. When predetermined exception condition is not satisfied, the providing unit provides, as the mobile station position information, the position of the mobile terminal calculated by the calculating unit. When the predetermined exception condition is satisfied, the providing unit provides, as the mobile station position information, the position of the base station acquired by the position information acquiring unit, instead of using the position of the mobile terminal calculated by the calculating unit.

According to the first aspect, when the predetermined exception condition is satisfied, the providing unit provides, as the mobile station position information, the position of the base station acquired by the position information acquiring unit, instead of using the position of the mobile terminal calculated by the calculating unit.

In other words, the radio communication system interprets a position of the mobile terminal as the position of the base station in a case where accuracy of estimating the position of the mobile terminal is degraded even with an attempt to highly accurately estimate the position of the mobile terminal on the basis of the position information on the base station and the delay time.

Thus, accuracy of estimating the position of the mobile terminal is improved by introduction of the predetermined exception condition.

In the aspect of the present invention, the predetermined exception condition is that a cover area of the base station is smaller than a predetermined area.

In the aspect of the present invention, the predetermined exception condition is that a directivity of an antenna provided in the base station is not defined.

In the aspect of the present invention, the radio communication system further includes a map information storage configured to store map information which at least identifies an area where the mobile terminal may not exist. The predetermined exception condition is that the position of the mobile terminal calculated by the calculating unit is within an area where the mobile terminal may not exist.

In the aspect of the present invention, after acquiring a corrected delay time by correcting the delay time in accordance with a length of a cable connecting a main body of the base station to an antenna provided in the base station, the calculating unit calculates the position of the mobile terminal by using the corrected delay time.

In the aspect of the present invention, the mobile terminal is connected to a plurality of base stations. Priorities are set for the plurality of base stations. The calculating unit calculates the position of the mobile terminal by using a position of a priority base station, for which the highest priority is set, among the plurality of base stations. The providing unit provides the position of the priority base station as the mobile station position information when the predetermined exception condition is satisfied.

In the aspect of the present invention, a position information providing apparatus provides mobile station position information indicating a position of a mobile terminal. The position information providing apparatus includes a delay time acquiring unit configured to acquire a delay time of a signal transmitted between the mobile terminal and a base station that performs radio communication with the mobile terminal; a position information acquiring unit configured to acquire a position of the base station; a calculating unit configured to calculate the position of the mobile terminal on the basis of the delay time acquired by the delay time acquiring unit, and the position of the base station acquired by the position information acquiring unit; and a providing unit configured to provide the mobile station position information. When a predetermined exception condition is not satisfied, the providing unit provides, as the mobile station position information, the position of the mobile terminal calculated by the calculating unit. When the predetermined exception condition is satisfied, the providing unit provides, as the mobile station position information, the position of the base station acquired by the position information acquiring unit, instead of using the position of the mobile terminal calculated by the calculating unit.

In the aspect of the present invention, the predetermined exception condition is that a cover area of the base station is smaller than a predetermined area.

In the aspect of the present invention, the predetermined exception condition is that a directivity of an antenna provided in the base station is not defined.

In the aspect of the present invention, the position information providing apparatus further includes a map information storage configured to store therein map information which allows at least identifying an area where the mobile terminal may not exist. The predetermined exception condition is that the position of the mobile terminal calculated by the calculating unit is within an area where the mobile terminal may not exist.

In the aspect of the present invention, after acquiring a corrected delay time by correcting the delay time in accordance with a length of a cable connecting a main body of the base station to an antenna provided in the base station, the calculating unit calculates the position of the mobile terminal by using the corrected delay time.

In the aspect of the present invention, the mobile terminal is connected to a plurality of base stations. Priorities are set for the plurality of base stations. The calculating unit calculates the position of the mobile terminal by using a position of a priority base station, for which the highest priority is set, among the plurality of base stations. The providing unit provides the position of the priority base station as the mobile station position information when the predetermined exception condition is satisfied.

According to the present invention, a radio communication system and a position information providing apparatus can be provided that are able to enhance accuracy of estimating a position of a mobile terminal.

BEST MODE FOR CARRYING OUT THE INVENTION

In the following, radio communication systems according to embodiments of the present invention will be described with reference to the drawings. Note that, in the description of the drawings below, the same or similar parts are denoted by the same or similar reference numerals.

However, it should be noted that the drawings are schematic, and that ratios between dimensions, and the like, are different from actual ones. Accordingly, specific dimensions and the like should be judged in consideration of the following description. Additionally, parts having dimensions whose mutual relationships or ratios are different among the drawings are included as a matter of course.

[First Embodiment]
(Configuration of Radio Communication System)

Figure 1:
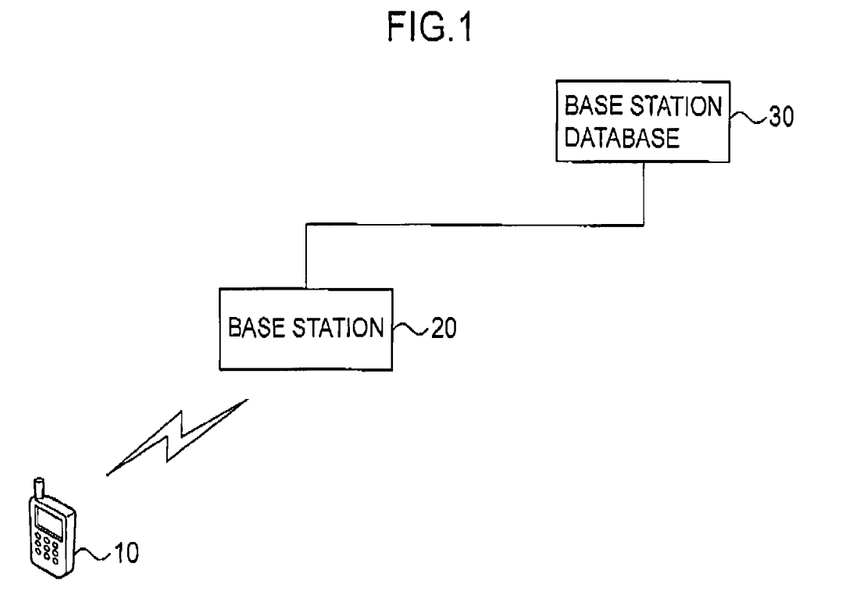
FIG. 1 is a diagram showing a configuration of a radio communication system according to a first embodiment.

In the following, a configuration of a radio communication system according to a first embodiment will be described with reference to the drawing. FIG. 1 is a diagram showing the configuration of the radio communication system according to the first embodiment.

As shown in FIG. 1, the radio communication system includes a mobile terminal 10, a base station 20 and a base station database 30.

The mobile terminal 10 is a terminal that performs radio communication with the base station 20. For example, the mobile terminal 10 is a mobile phone, a FDA or the like.

The mobile terminal 10 transmits a position request to the base station 20, the position request being used for requesting position information on the terminal itself. The mobile terminal 10 receives a delay time request used for requesting a delay time of a signal transmitted between the terminal itself and the base station 20. The mobile terminal 10 acquires the delay time of the signal transmitted between the terminal itself and the base station 20, and transmits the delay time to the base station 20. The mobile terminal 10 receives the position information on the terminal itself from the base station 20.

Note that, in the first embodiment, the position information is a position specified by latitude and longitude.

The base station 20 has an area (hereinafter, cover area) in which the base station 20 can perform radio communication with the mobile terminal 10. A size of the cover area of the base station 20 is different depending on a location in which the base station 20 is placed. For example, in a case where the base station 20 is placed in a city, the cover area of the base station 20 is smaller than a predetermined area. On the other hand, in a case where the base station 20 is placed in a suburb or a rural area, the cover area of the base station 20 is larger than the predetermined area. Thereby, the number of mobile terminals 10 that can perform communication with the base station 20 is limited to not more than a predetermined number.

The base station 20 transmits the delay time request, which is used for requesting a delay time of a signal transmitted between the station itself and the mobile terminal 10, to the mobile terminal 10. The base station 20 receives, from the mobile terminal 10, the delay time of the signal transmitted between the station itself and the mobile terminal 10. The base station 20 transmits a base station ID, through which the station itself is identified, and the delay time, to the base station database 30. The base station 20 receives the position information on the mobile terminal 10, which transmits the position request, from the base station database 30, and then, transmits the position information on the mobile terminal 10, which is received from the base station database 30, to the mobile terminal 10 that transmits the position request.

The base station database 30 is connected to the base station 20. The base station database 30 manages information such as position information on the base station 20.

The base station database 30 receives the base station ID and the delay time from the base station 20. The base station database 30 generates the position information on the mobile terminal 10 on the basis of: the position information on the base station 20 identified through the base station ID; and the delay time. The base station database 30 transmits the position information on the mobile terminal 10 to the base station 20.

(Configuration of Base Station Database)

Figure 2:
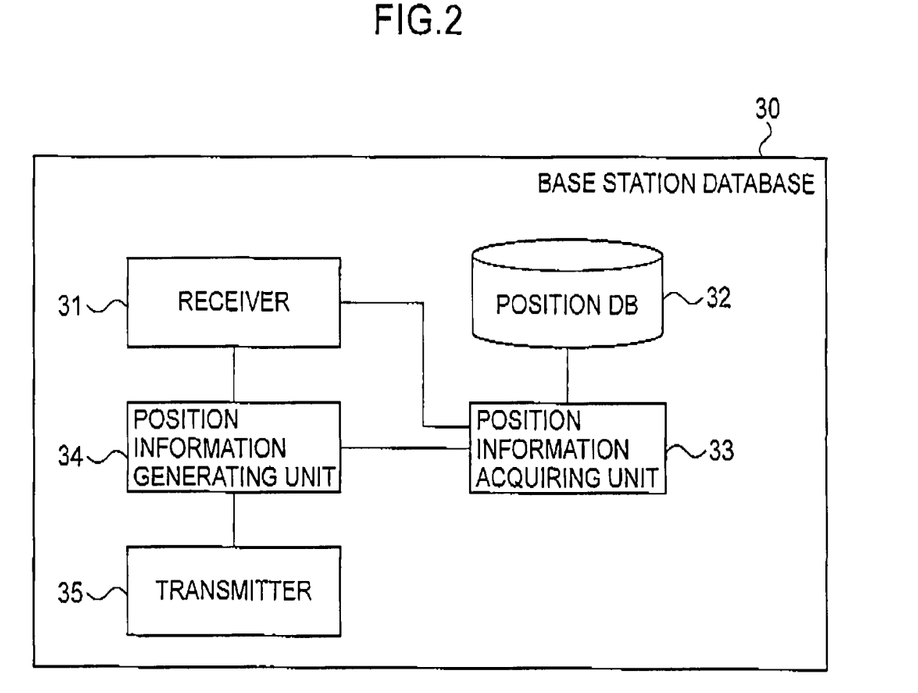
FIG. 2 is a block diagram showing a configuration of a base station database 30 according to the first embodiment.

In the following, a configuration of the base station database according to the first embodiment will be described with reference to the drawings. FIG. 2 is a block diagram showing a configuration of the base station database 30 according to the first embodiment.

As shown in FIG. 2, the base station database 30 includes a receiver 31, a position DB 32, a position information acquiring unit 33, a position information generating unit 34 and a transmitter 35.

The receiver 31 receives the delay time of the signal transmitted between the mobile terminal 10 and the base station 20, and the base station ID, through which the base station 20 is identified, from the base station 20. In other words, the receiver 31 is a delay time acquiring unit that acquires the delay time of the signal transmitted between the mobile terminal 10 and the base station 20.

Figure 3:
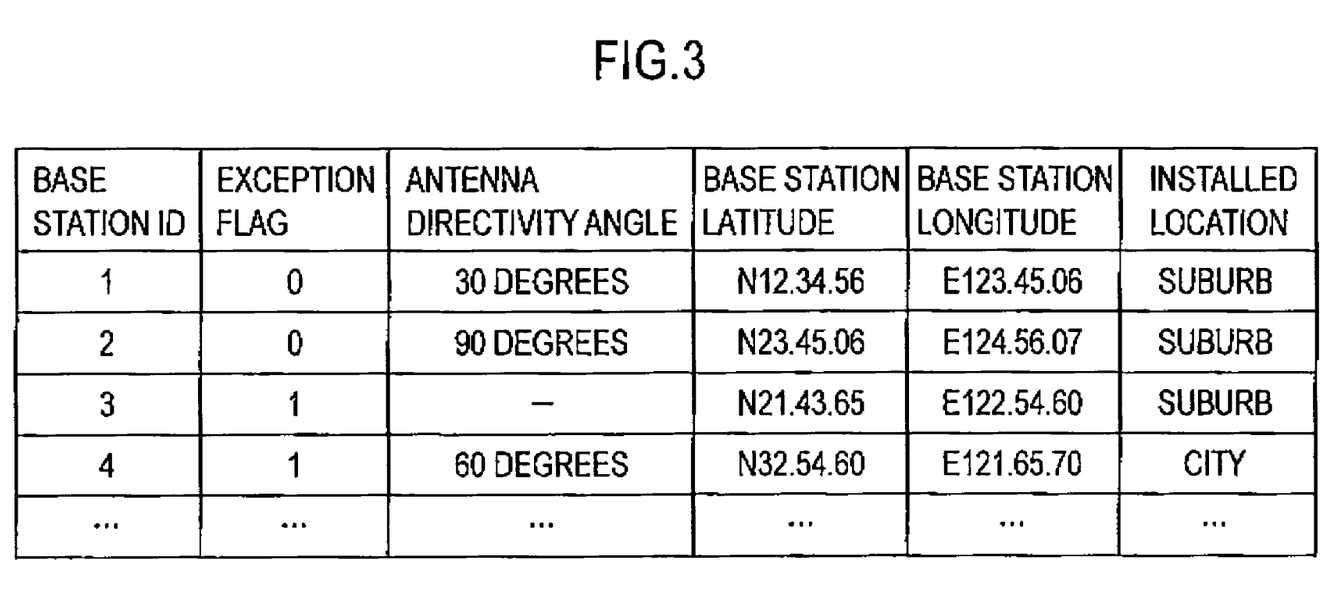
FIG. 3 is a diagram showing one example of information stored in a position DB 32 according to the first embodiment.

The position DB 32 is a database that stores therein position information on each of the base stations 20. Specifically, as shown in FIG. 3, the position DB 32 stores therein a base station ID, an exception flag, an antenna directivity angle, base station latitude and base station longitude with respect to each of the base stations 20.

The base station ID is, as has been described above, information through which the base station 20 is identified.

The exception flag is a flag used for determining whether or not a position of the mobile terminal 10 should be specified on the basis of the position information (latitude and longitude) of the base station 20 and the delay time Specifically, when "0" is set in the exception flag, the exception flag indicates that the position of the mobile terminal 10 should be estimated on the basis of the position information on the base station 20 and the delay time. On the other hand, when "1" is set in the exception flag, the exception flag indicates that the position of the mobile terminal 10 should not be estimated on the basis of the position information on the base station 20 and the delay time.

Note that, when "1" is set in the exception flag, the position information on the base station 20 is considered as the position of the mobile terminal 10 as will be described later.

Here, in the first embodiment, cases where "1" is set in the exception flag include: (1) a case where a cover area of the base station 20 is smaller than a predetermined area; and (2) a case where a directivity angle of an antenna provided in the base station 20 is not defined in the position DB 32.

Take the above-described case (1) (refer to base station ID=4) as an example where the base station 20 is provided in a city. Here, plural base stations 20 are assumed to be congested. In this case, if the position of the mobile terminal 10 is estimated on the basis of the position information on the base station 20 and the delay time, there is an adverse effect of degrading accuracy of estimating the position of the mobile terminal 10. Additionally, since the cover area of the base station 20 is small, there is no harm in considering the position information on the base station 20 as the position of the mobile terminal 10. Consequently, "1" is set in the exception flag.

Take the above-described case (2) (refer to base station ID=3) as an example where an antenna provided in the base station 20 is a non directivity antenna. In this case, accuracy of estimating the position of the mobile terminal 10 is low even if the position of the mobile terminal 10 is estimated on the basis of the position information on the base station 20 and the delay time Consequently, "1" is set in the exception flag.

The antenna directivity angle is information indicating a directivity angle of an antenna provided in the base station 20. Specifically, the antenna directivity angle is an angle formed by a centerline of a beam outputted by the antenna provided in the base station 20, and a reference line (for example, a longitude line or a latitude line).

The base station latitude and base station longitude are information indicating latitude and longitude of the base station 20.

The position information acquiring unit 33 searches the position DB 32 by using a base station ID as a search key, the base station ID being received from the base station 20. The position information acquiring unit 33 acquires information (the exception flag, the antenna directivity angle, the base station latitude and the base station longitude) associated with the base station ID. In other words, the position information acquiring unit 33 is a position information acquiring unit that acquires position information on the base station 20.

The position information generating unit 34 generates the position information on the mobile terminal 10 on the basis of the delay time (the delay time of a signal transmitted between the mobile terminal 10 and the base station 20), and the information (the exception flag, the antenna directivity angle, the base station latitude and the base station longitude) acquired by the position information acquiring unit 33.

Here, when "0" is set in the exception flag, the position information generating unit 34 calculates the position information on the mobile terminal 10 on the basis of the delay time, the antenna directivity angle, and the position information on the base station 20 (the base station latitude and the base station longitude). In other words, the position information generating unit 34 is a calculating unit that calculates the position of the mobile terminal 10 on the basis of the delay time and the position information on the base station 20.

Figure 4:
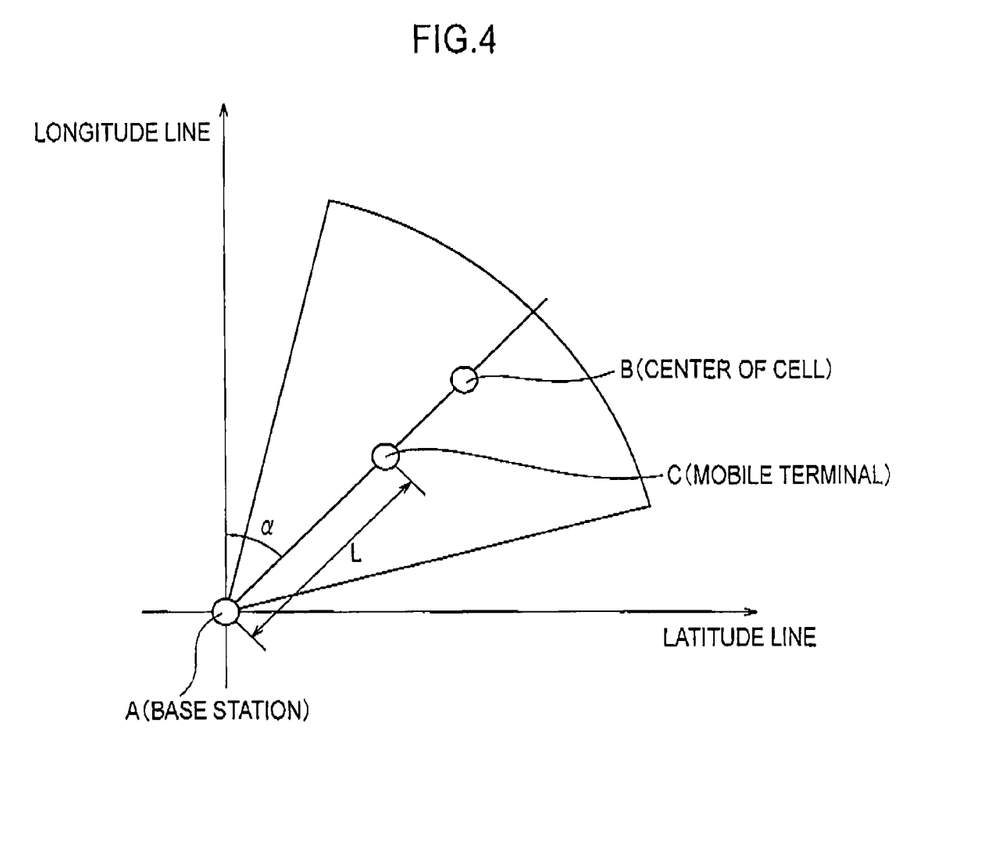
FIG. 4 is a diagram provided for explaining a method of calculating a position of a mobile terminal 10 according to the first embodiment.

Specifically, as shown in FIG. 4, the position C (Lo1, La1) of the mobile terminal 10 is calculated on axes of coordinates having origin at a position A (Lo0, La0) of the base station 20. Note that Lo0 and La0 indicate the latitude and longitude of the base station 20, and that Lo1 and La1 indicate the latitude and longitude of the mobile terminal 10. For example, the position C of the mobile terminal 10 is calculated by use of the following equation (1):

[Formula 1]

$$(Lo1, La1) = \left( Lo0 + \frac{L\cos(\alpha)}{30.83}, La0 + \frac{L\sin(\alpha)}{25.28} \right),$$   Equation (1)

where: α denotes the antenna directivity angle; L, a distance between the mobile terminal 10 and the base station 20 (L is found on the basis of the delay time); (Lo0, La0), the latitude and longitude of the base station 20; and (Lo1, La1), the latitude and longitude of the mobile terminal 10.

Note that the distance L between the mobile terminal 10 and the base station 20 can be calculated by use of the following equation (2):

[Formula 2]

$$L = ct, \quad \text{Equation (2)}$$

where: c denotes a light speed; and t, the delay time of the signal transmitted between the mobile terminal 10 and the base station 20.

Thus, when "0" is set in the exception flag, the position information generating unit 34 uses the position C (Lo1, La1) of the mobile terminal 10 as the position information on the mobile terminal 10.

On the other hand, when "1" is set in the exception flag, the position information generating unit 34 acquires the position A (Lo0, La0) of the base station 20 instead of calculating the position C (Lo1, La1) of the mobile terminal 10. In other words, the position information generating unit 34 uses the position A (Lo0, La0) of the base station 20 as the position information on the mobile terminal 10.

The transmitter 35 transmits the position information on the mobile terminal 10, which is generated by the position information generating unit 34, to the base station 20. In other words, the transmitter 35 is a providing unit that provides the position information on the mobile terminal 10.

(Operations of Radio Communication System)

Figure 5:
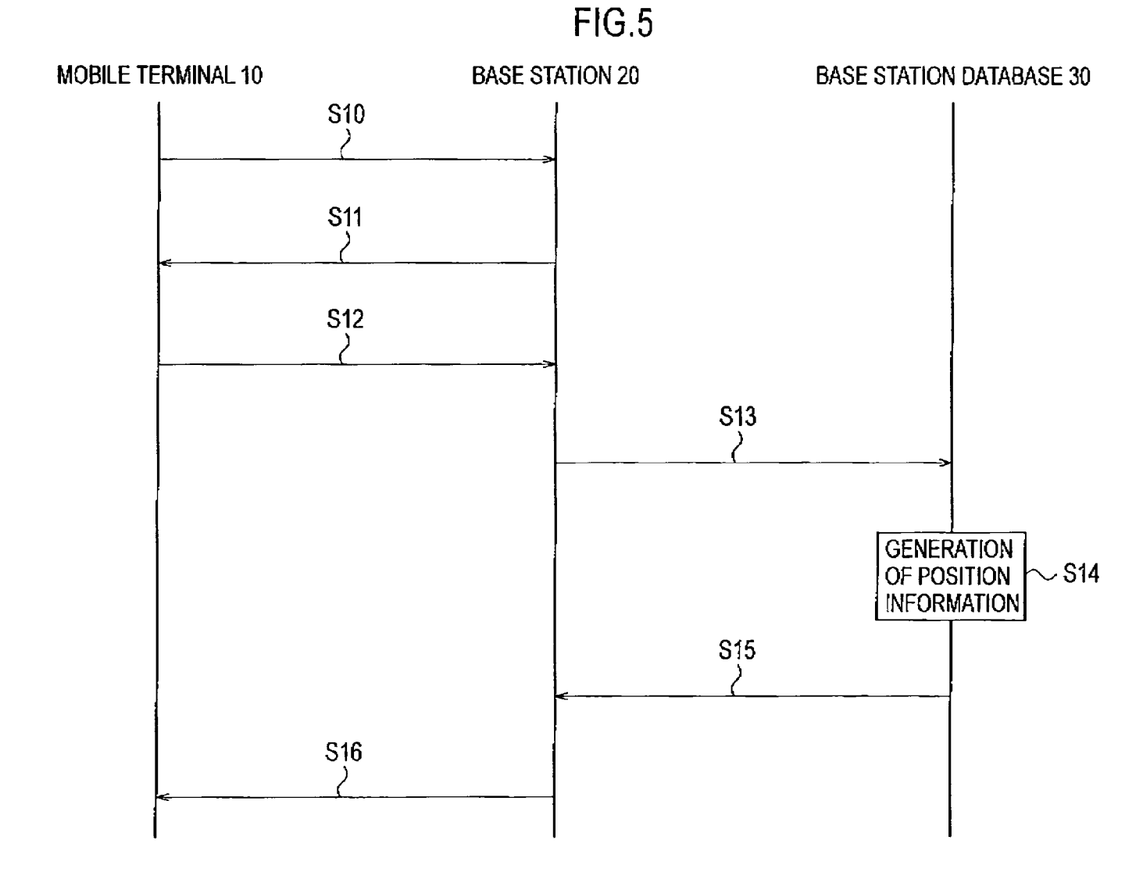
FIG. 5 is a sequence chart showing operations of the radio communication system according to the first embodiment.

In the following, operations of the radio communication system according to the first embodiment will be described with reference to the drawings. FIG. 5 is a sequence chart showing operations of the radio communication system according to the first embodiment.

As shown in FIG. 5, in step 10, the mobile terminal 10 transmits the position request, which is used for requesting the position information on the mobile terminal 10 (the terminal itself), to the base station 20.

In step 11, the base station 20 transmits the delay time request, which is used for requesting the delay time of the signal transmitted between the station itself and the mobile terminal 10, to the mobile terminal 10.

In step 12, the mobile terminal 10 acquires the delay time of the signal transmitted between the terminal itself and the base station 20. Specifically, the mobile terminal 10 acquires the delay time on the basis of a period (a round trip time or RTT) from a time of transmitting the position request to a time of receiving the delay time request. The mobile terminal 10 transmits the delay time to the base station 20.

In step 13, the base station 20 transmits a base station ID, through which the base station 20 (the station itself) is identified, and the delay time, to the base station database 30.

In step 14, the base station database 30 generates the position information on the mobile terminal 10.

Specifically, when "0" is set in an exception flag corresponding to the base station ID, the base station database 30 calculates a position C (Lo1, La1) of the mobile terminal 10 on the basis of: the position information on the base station 20; the antenna directivity angle; and the delay time. In other words, when "0" is set in the exception flag, the base station database 30 uses the position C (Lo1, La1) of the mobile terminal 10 as the position information on the mobile terminal 10.

On the other hand, when "1" is set in the exception flag, the base station database 30 acquires the position A (Lo0, La0) of the base station 20 instead of calculating the position C (Lo1, La1) of the mobile terminal 10.

In other words, the position information generating unit 34 uses the position A (Lo0, La0) of the base station 20 as the position information on the mobile terminal 10.

In step 15, the base station database 30 transmits the position information on the mobile terminal 10, which is generated in step 14, to the base station 20.

In step 16, the base station 20 transmits the position information on the mobile terminal 10, which is received from the base station database 30, to the mobile terminal 10 that transmits the position request.

Figure 6:
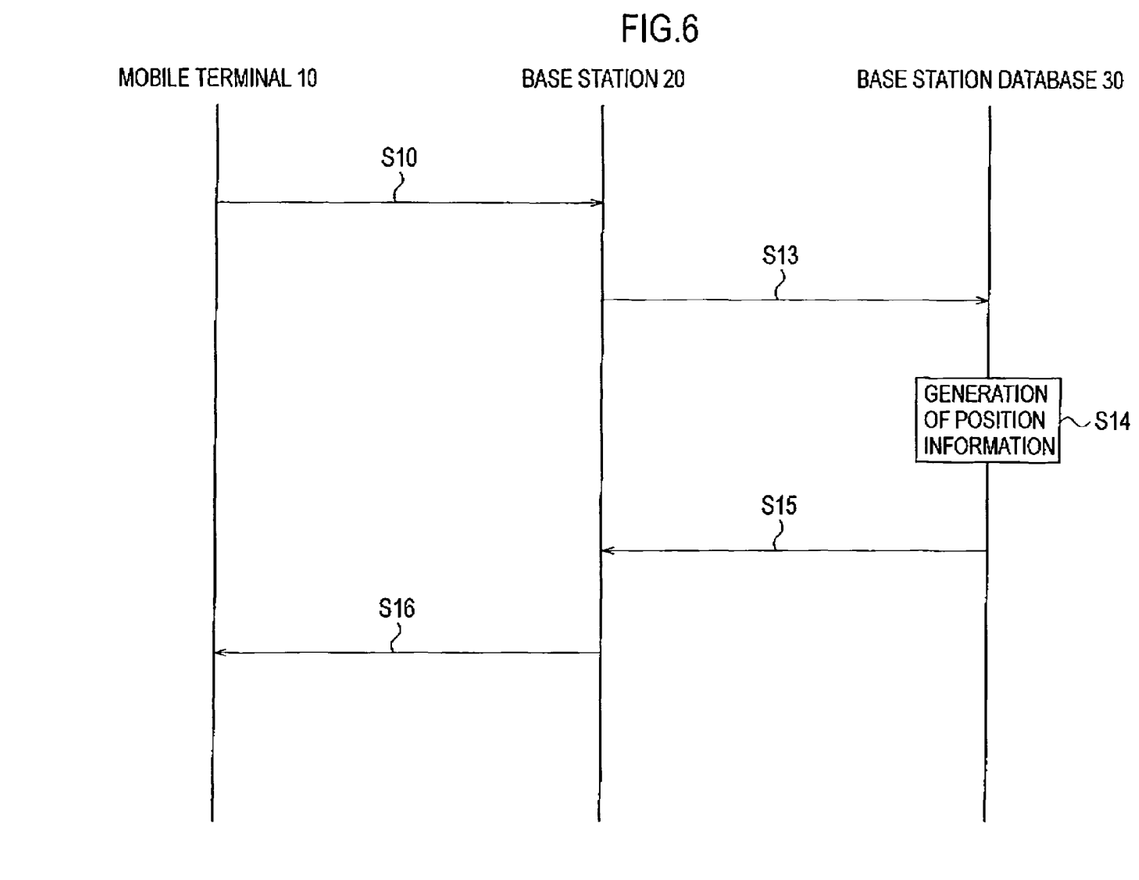
FIG. 6 is a sequence chart showing operations of the radio communication system according to the first embodiment.

Note that, as shown in FIG. 6, in a case where the base station 20 already grasps the delay time of the signal transmitted between the mobile terminal 10 and the base station 20, step 11 and step 12 described above may be skipped. As such a case, there can be considered: a case where, since there is communication performed between the mobile terminal 10 and the base station 20 before the mobile terminal 10 transmits the position request, the base station 20 already grasps the delay time in the communication; or the like.

(Advantageous Effects)

According to the radio communication system according to the first embodiment, when "1" is set in the exception flag, the base station database 30 uses the position A (Lo0, La0) of the base station 20 as the position information of the mobile terminal 10 instead of calculating the position C (Lo1, La1) of the mobile terminal 10.

In other words, the base station database 30 interprets a position of the mobile terminal as the position of the base station in a case where accuracy of estimating the position of the mobile terminal 10 is degraded even with an attempt to highly accurately estimate the position of the mobile terminal 10 on the basis of the position information on the base station 20 and the delay time.

Thus, accuracy of estimating the position of the mobile terminal is improved by introduction of the exception flag.

[Second Embodiment]

In the following, a second embodiment will be described with reference to the drawings. In the following, differences between the above-described first embodiment and the second embodiment will be mainly described.

Specifically, in the above-described first embodiment, the mobile terminal 10 requests the position information on the terminal itself. On the other hand, in the second embodiment, another terminal that is different from the mobile terminal 10 requests the position information on the mobile terminal 10.

(Configuration of Radio Communication System)

Figure 7:
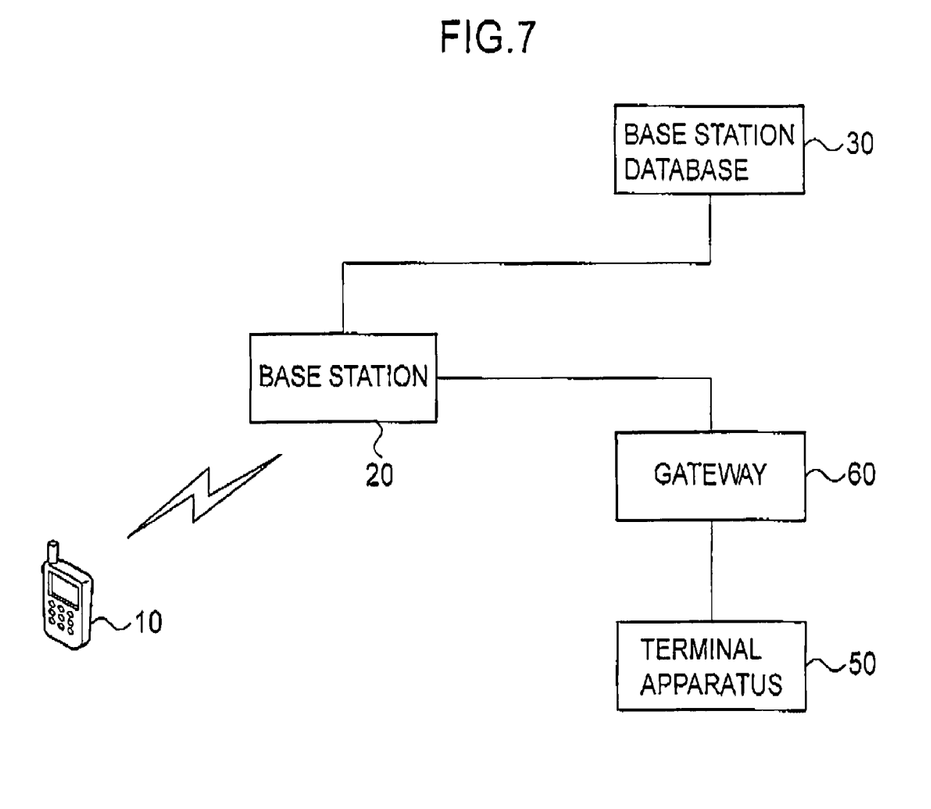
FIG. 7 is a diagram showing a configuration of a radio communication system according to a second embodiment.

In the following, a configuration of a radio communication system according to the second embodiment will be described with reference to the drawing. FIG. 7 is a diagram showing the configuration of the radio communication system according to the second embodiment.

As shown in FIG. 7, the radio communication system includes a terminal apparatus 50 and a gateway 60 in addition to the configuration shown in FIG. 1.

The terminal apparatus 50 is an apparatus that requests the position information on the mobile terminal 10. For example, the terminal apparatus 50 is a personal computer.

The gateway 60 is connected to the base station 20, and functions as an interface server between a radio communication network and the terminal apparatus 50, the radio communication network including the base station 20. For example, the gateway 60 is an HTTP server or the like.

(Operations of Radio Communication System)

Figure 8:
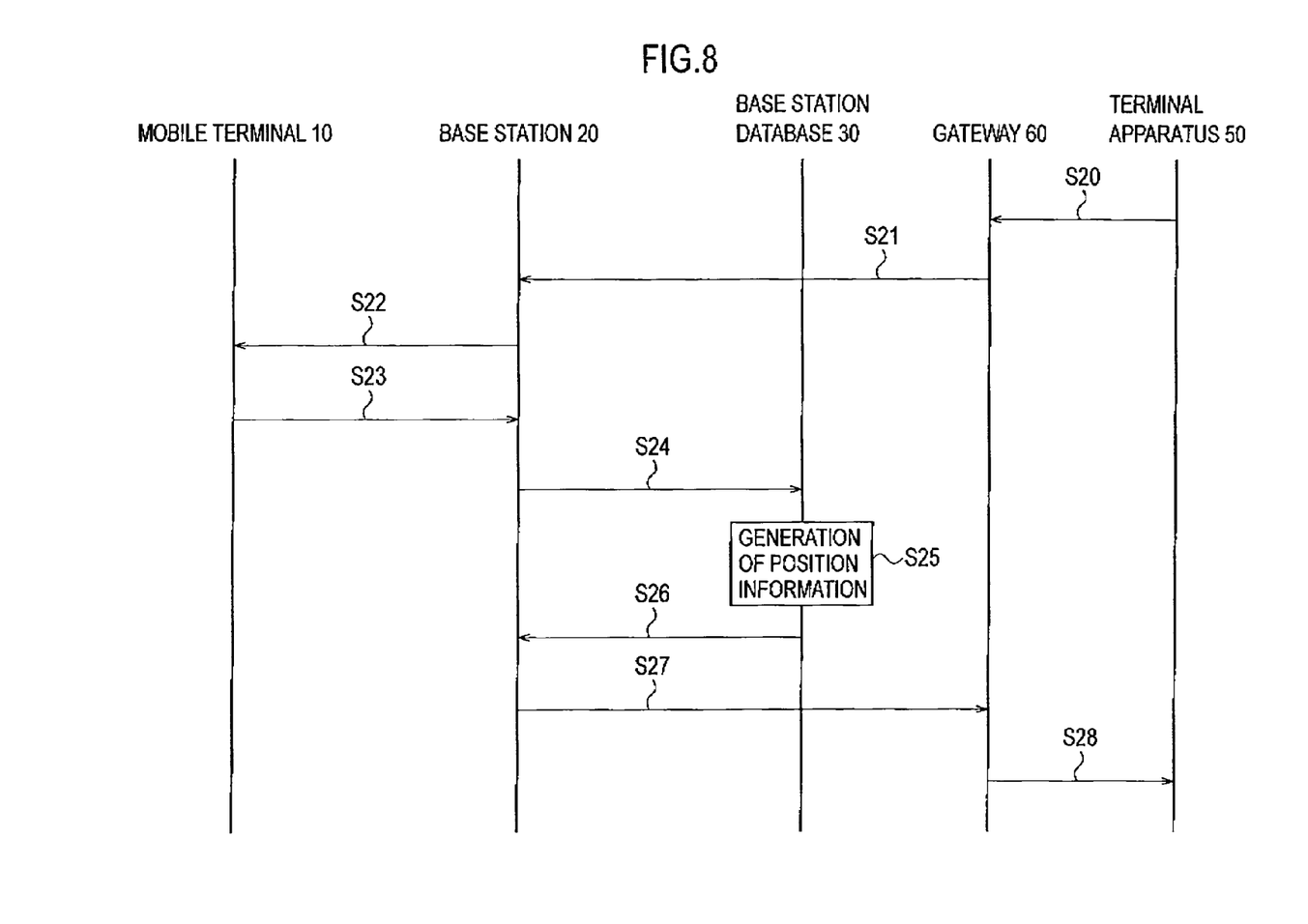
FIG. 8 is a sequence chart showing operations of the radio communication system according to the second embodiment.

In the following, operations of the radio communication system according to the second embodiment will be described with reference to the drawing. FIG. 8 is a sequence chart showing operations of the radio communication system according to the second embodiment.

As shown in FIG. 8, in step 20, the terminal apparatus 50 transmits a position request to the gateway 60, the position request being used for requesting the position information on the mobile terminal 10. In step 21, the gateway transmits the position request to the base station 20.

In step 22, the base station 20 transmits, as in step 11, a delay time request to the mobile terminal 10, the delay time request being used for requesting a delay time of a signal transmitted between the mobile terminal 10 and the base station 20.

In step 23, the mobile terminal 10 acquires, as in step 12, the delay time of the signal transmitted between the mobile terminal 10 and the base station 20. The mobile terminal 10 transmits the delay time to the base station 20.

In step 24, the base station 20 transmits, as in step 13, a base station ID, through which the base station 20 (the station itself) is identified, and the delay time, to the base station database 30.

In step 25, the base station database 30 generates, as in step 14, the position information on the mobile terminal 10.

In step 26, the base station database 30 transmits, as in step 15, the position information on the mobile terminal 10, which is generated in step 25, to the mobile terminal 10.

In step 27, the base station 20 transmits the position information on the mobile terminal 10, which is received from the base station database 30, to the gateway 60. In step 28, the gateway 60 transmits the position information on the mobile terminal 10 to the terminal apparatus 50 that transmits the position request.

[Third Embodiment]

In the following, a third embodiment will be described with reference to the drawings. In the following, differences between the above-described first embodiment and the third embodiment will be mainly described.

Specifically, in the above-described first embodiment, the mobile terminal 10 receives the position information on the terminal itself. On the other hand, in the third embodiment, another terminal that is different from the mobile terminal 10 receives the position information on the mobile terminal 10.

Note that a configuration of a radio communication system according to the third embodiment is the same as the configuration of the radio system according to the second embodiment.

(Operations of Radio Communication System)

Figure 9:
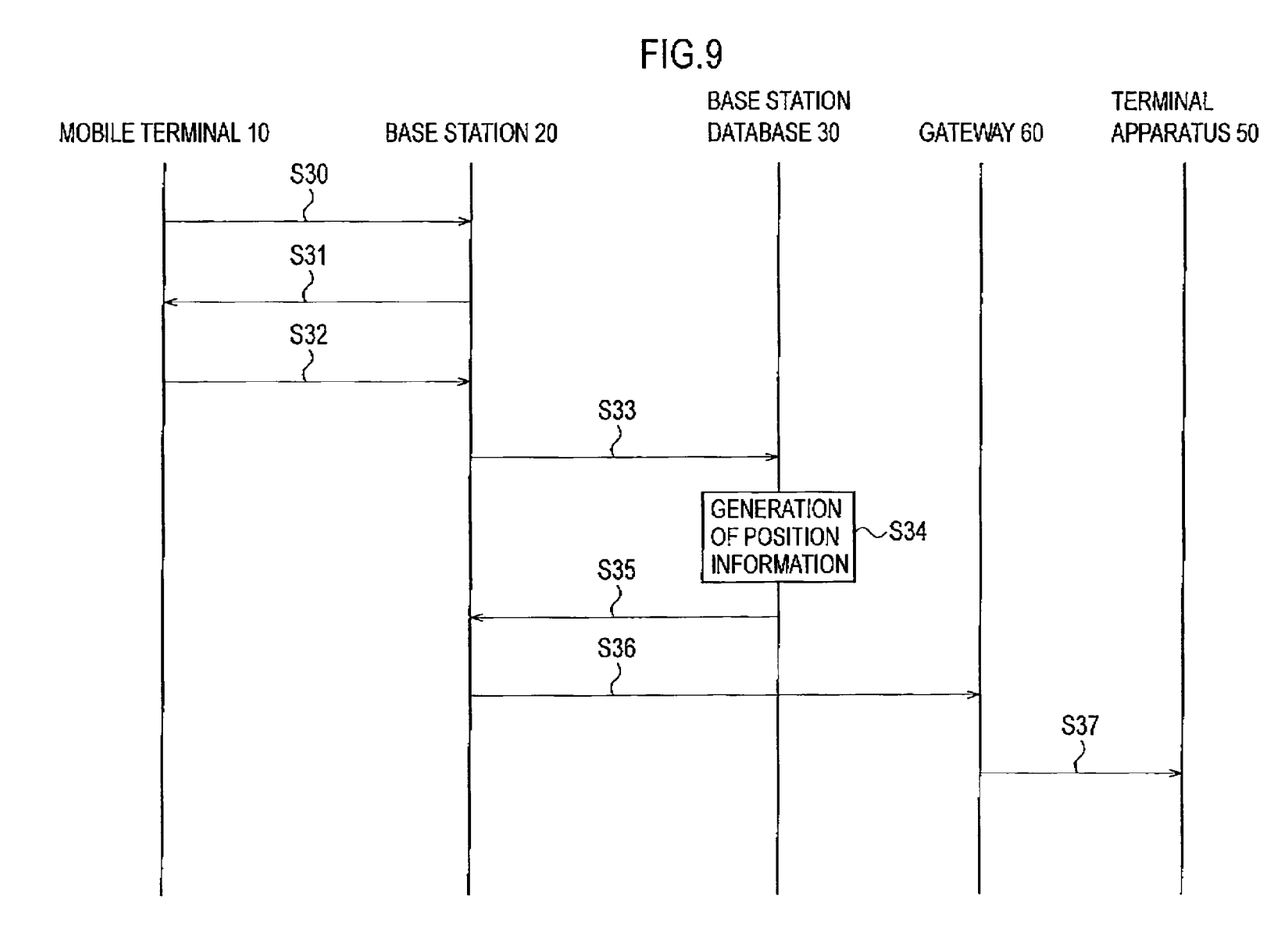
FIG. 9 is a sequence chart showing operations of the radio communication system according to a third embodiment.

In the following, operations of the radio communication system according to the third embodiment will be described with reference to the drawing. FIG. 9 is a sequence chart showing operations of the radio communication system according to the third embodiment.

Note that processing in steps 30 to 35 is the same as the processing in steps 10 to 15 described above. However, in step 30, the mobile terminal 10 designates the terminal apparatus 50 that should receive the position information on the mobile terminal 10 (the terminal itself). Accordingly, it should be noted that a terminal ID, through which the terminal apparatus 50 is identified, is added to the position request transmitted from the mobile terminal 10 in step 30.

As shown in FIG. 9, in step 36, the base station 20 transmits the position information on the mobile terminal 10, which is received from the base station database 30, to the gateway 60. In step 37, the gateway 60 transmits the position information on the mobile terminal 10 to the terminal apparatus 50 designated by the mobile terminal 10. Note that, as a matter of course, the terminal ID added to the position request is used in step 37.

[Fourth Embodiment]

In the following, a fourth embodiment will be described with reference to the drawings. In the following, differences between the above-described first embodiment and the fourth embodiment will be described.

Specifically, in the above-described first embodiment, the number of the base stations 20 that the mobile terminal 10 is connected to (acquires) is one. On the other hand, in the fourth embodiment, the number of the base stations 20 that the mobile terminal 10 is connected to (acquires) is plural.

Note that, in the fourth embodiment, a case where base station-to-base station handover is performed is given as an example for the case where the mobile terminal 10 acquires plural base stations 20. As a matter of course, the case where the mobile terminal 10 acquires plural base stations 20 is not limited to the case where base station-to-base station handover is performed.

(Configuration of Radio Communication System)

Figure 10:
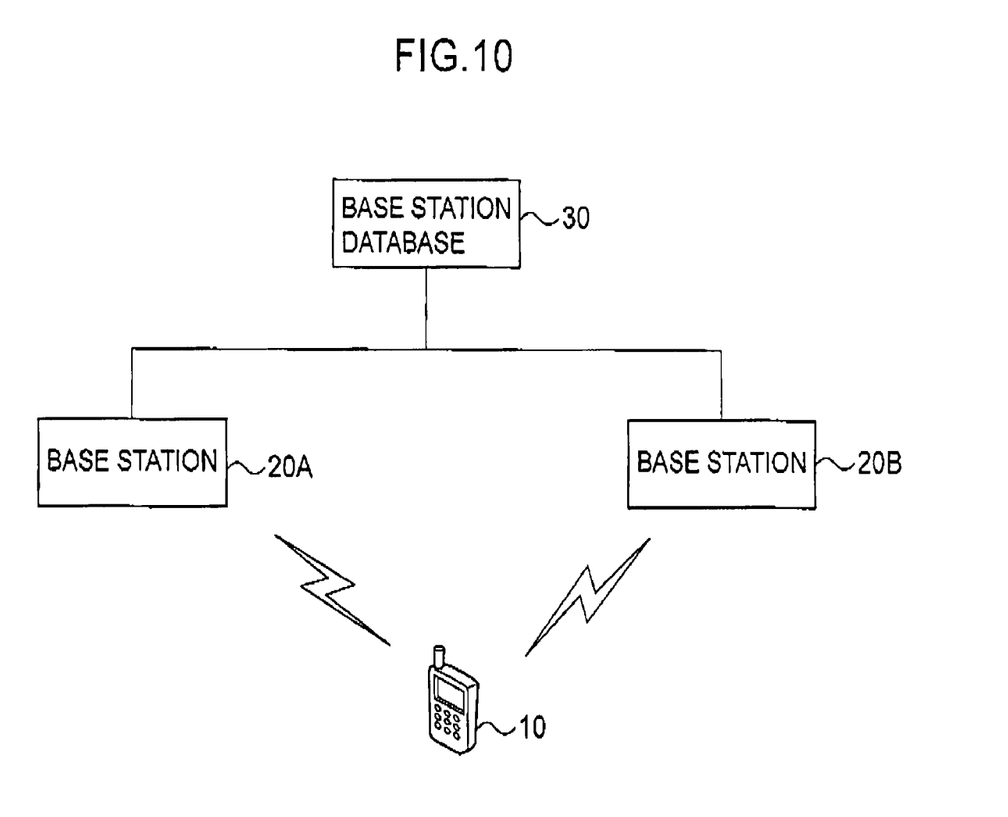
FIG. 10 is a diagram showing a configuration of a radio communication system according to a fourth embodiment.

In the following, a configuration of a radio communication system according to the fourth embodiment will be described with reference to the drawing. FIG. 10 is a diagram showing the configuration of the radio communication system according to the fourth embodiment.

As shown in FIG. 10, the mobile terminal 10 is connected to plural base stations 20 (a base station 20A and a base station 20B) in the radio communication system. In other words, the mobile terminal 10 acquires the plural base stations 20, and retains base station IDs of those base stations 20 acquired by the terminal itself.

(Information Stored in Position Information DB)

Figure 11:
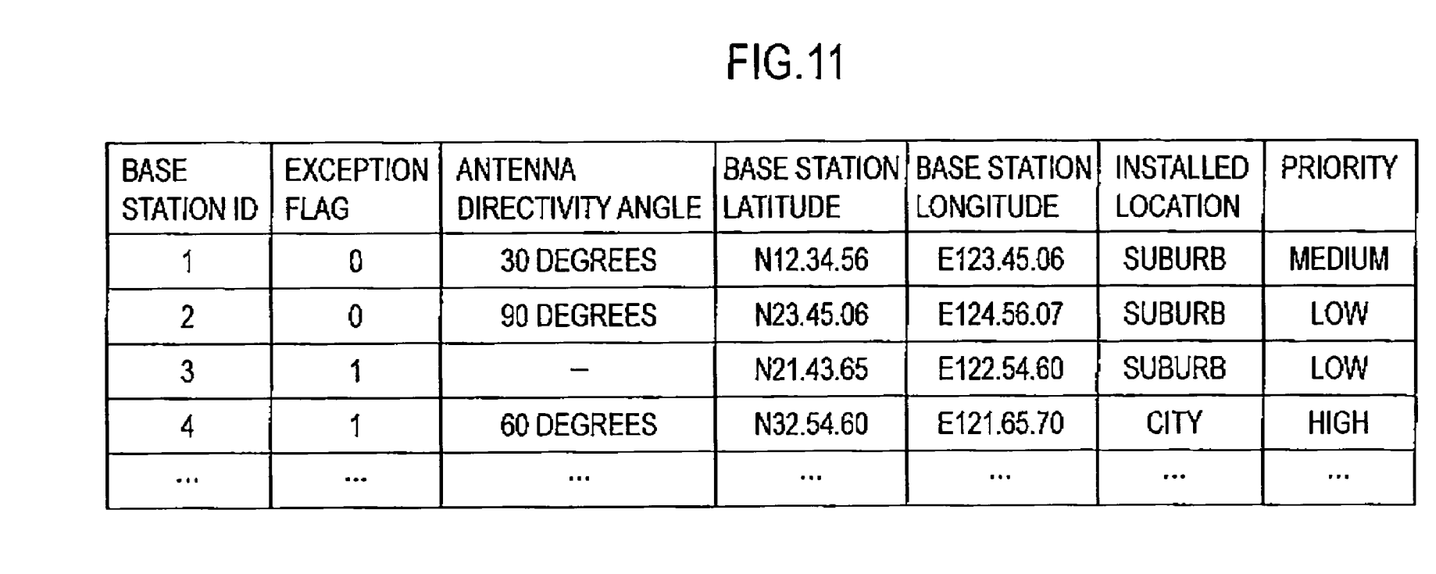
FIG. 11 is a diagram showing one example of information stored in a position DB 32 according to the fourth embodiment.

In the following, information stored in a position information DB according to the fourth embodiment will be described with reference to the drawing. FIG. 11 is a diagram showing one example of information stored in the position DB 32 according to the fourth embodiment.

As shown in FIG. 11, the position DB 32 stores therein information with respect to each of the base stations 20, the information including a base station ID, an exception flag, an antenna directivity angle, base station latitude, base station longitude and a priority being associated with one another.

The priority is a priority level of the base station 20, the priority level being used for generating the position information on the mobile terminal 10 in a case where the number of the base stations 20 acquired by the mobile terminal 10 is plural.

(Operations of Radio Communication System)

Figure 12:
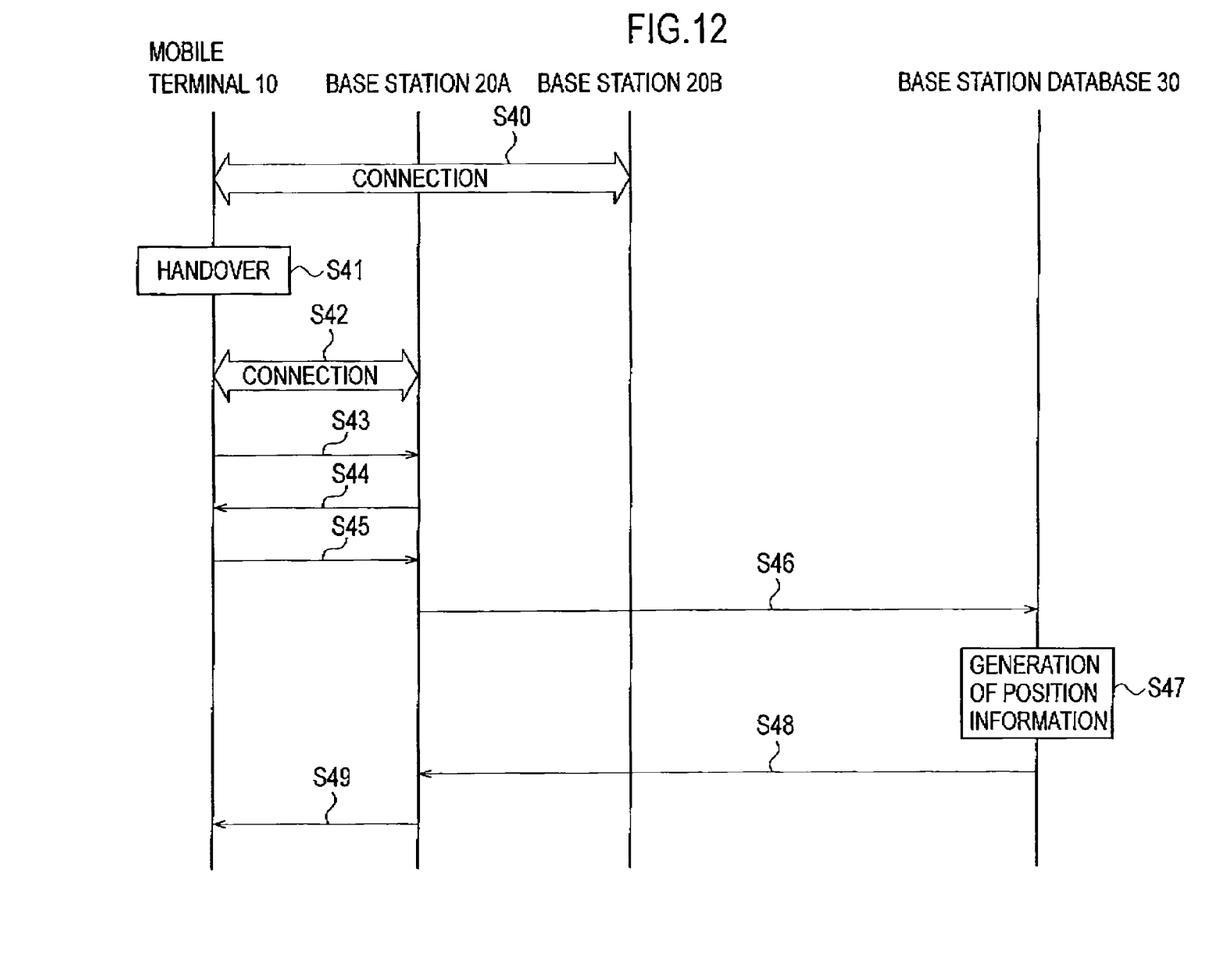
FIG. 12 is a sequence chart showing operations of the radio communication system according to the fourth embodiment.

In the following, operations of the radio communication system according to the fourth embodiment will be described with reference to the drawing. FIG. 12 is a sequence chart showing operations of the radio communication system according to the fourth embodiment.

As shown in FIG. 12, in step 40, the mobile terminal 10 is connected to the base station 20A. In other words, the mobile terminal 10 acquires the base station 20A, and retains a base station ID of the base station 20A.

As shown in FIG. 12, in step 41, the mobile terminal 10 performs base station-to-base station handover between the base station 20A and the base station 20B.

In step 42, the mobile terminal 10 is connected to the base station 20B. In other words, the mobile terminal 10 acquires the base station 20B, and retains a base station ID of the base station 20B.

Processing in steps 43 to 46 is the same as the processing in steps 10 to 13 described above.

However, in step 43, the mobile terminal 10 adds the base station IDs of the plural base stations 20, which the mobile terminal 10 (the terminal itself) is connected to (acquires), to the position request. Note that, in a case where the mobile terminal 10 transmits the position request to the base station 20A, only the base station ID of the base station 20B may be added to the position request.

Additionally, the mobile terminal 10 may add a delay time of a signal, which is transmitted between the mobile terminal 10 (the terminal itself) and the base station 20B, to the position request. The delay time of the signal transmitted between the mobile terminal 10 and the base station 20B is acquirable in step 40.

In step 47, the base station database 30 generates, as in step 14, the position information on the mobile terminal 10.

Here, the base station database 30 specifies one of the base stations 20 (a priority base station) to which the highest priority is given among the plural base stations 20 acquired by the mobile terminal 10.

Subsequently, when "0" is set in an exception flag corresponding to the priority base station, the base station database 30 calculates the position C (Lo1, La1) of the mobile terminal 10 on the basis of: position information on and an antenna directivity angle of the priority base station; and the delay time. In other words, when "0" is set in the exception flag, the base station database 30 uses the position C (Lo1, La1) of the mobile terminal 10 as the position information on the mobile terminal 10.

On the other hand, when "1" is set in the exception flag, the base station database 30 acquires the position A (Lo0, La0) of the priority base station instead of calculating the position C (Lo1, La1) of the mobile terminal 10. In other words, the position information generating unit 34 uses the position A (Lo0, La0) of the priority base station as the position information on the mobile terminal 10.

Processing in steps 48 and 49 is the same as the processing in steps 15 and 16 described above.

[Fifth Embodiment]

In the following, a fifth embodiment will be described with reference to the drawings, In the following, differences between the above-described first embodiment and the fifth embodiment will be mainly described.

Specifically, in the above-described first embodiment, examples of the cases where the position A (Lo0, La0) of the base station 20 is used as the position information on the mobile terminal 10 are as follows: (1) a case where a cover area of the base station 20 is smaller than the predetermined area; and (2) a case where a directivity angle of an antenna provided in the base station 20 is not defined in the position DB 32.

On the other hand, in the fifth embodiment, the case where the position A (Lo0, La0) of the base station 20 is used as the position information on the mobile terminal 10 is a case where the position C (Lo1, La1) of the mobile terminal 10 falls within an area where the mobile terminal 10 may not exist.

(Configuration of Base Station DataBase)

Figure 13:
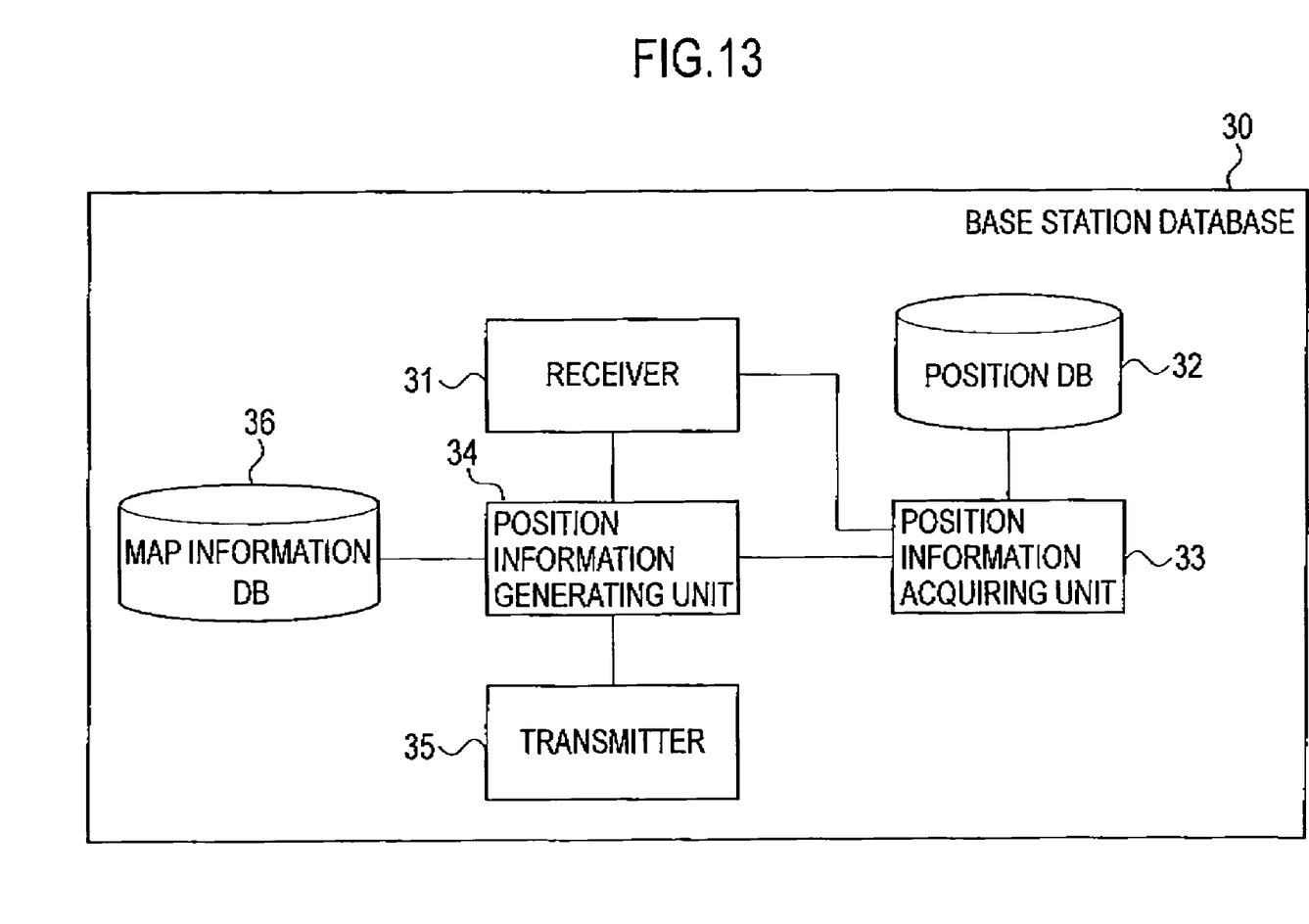
FIG. 13 is a block diagram showing a configuration of a base station database 30 according to a fifth embodiment.

In the following, information stored in the base station database according to the fifth embodiment will be described with reference to the FIG. 13 is a block diagram showing a configuration of the base station database 30 according to the fifth embodiment.

As shown in FIG. 13, the base station database 30 includes a map information DB 36 in addition to the configuration shown in FIG. 2.

The map information DB 36 stores therein map information through which an area (such as, for example, a location at sea) where the mobile terminal 10 may not exist is at least identifiable. Note that the cover area of the base station 20 may be plotted in the map information. Additionally, the map information may include information through which a location is identifiable as a city, a suburb or the like.

Here, when "0" is set in an exception flag corresponding to the base station ID, the position information generating unit 34 calculates the position C (Lo1, La1) of the mobile terminal 10 on the basis of: the position information on and the antenna directivity angle of the base station 20; and the delay time.

By referring to the map information DB 36, the position information generating unit 34 determines whether or not the position C (Lo1, La1) of the mobile terminal 10 falls within an area where the mobile terminal 10 may not exist.

If the position C (Lo1, La1) of the mobile terminal 10 falls within an area where the mobile terminal 10 may not exist, the position information generating unit 34 uses the position A (Lo0, La0) of the base station 20 as the position information on the mobile terminal 10, instead of using the position C (Lo1, La1) of the mobile terminal 10.

Note that, if the position C (Lo1, La1) of the mobile terminal 10 does not fall within an area where the mobile terminal 10 may not exist, the position information generating unit 34 uses the position C (Lo1, La1) of the mobile terminal 10 as the position information on the mobile terminal 10 as a matter of course.

[Other Embodiment]

Although the present invention has been described by use of the above-described embodiments, the descriptions and drawings constituting parts of this disclosure should not be understood as limiting the present invention. From this disclosure, various alternative embodiments, examples and operational techniques will be apparent to those skilled in the art.

For example, although the delay time acquiring unit, the position information acquiring unit, the calculating unit, the providing unit and a map information storage are basically provided in the base station database 30 in each of the above-described embodiments, the present invention is not limited to this configuration. The configuration of these may be distributed to the mobile terminal 10, the base station 20 and the base station database 30. Otherwise, the configuration of these may be provided in anther apparatus (the mobile terminal 10 or the base station 20).

Although not being mentioned in the above-described embodiments, the delay time of the signal transmitted between the mobile terminal 10 and the base station 20 may be corrected in accordance with a length of a cable connecting a main body of the base station 20 and an antenna provided in the base station 20 to each other. A corrected delay time corrected in accordance with the cable length may be used in calculating the position C (Lo1, La1) of the mobile terminal 10.

Noted that all of the contents described in Japanese Patent Application No. 2007-189841 (filed on Jul. 20, 2007) is incorporated in the description of the present application by reference.

Industrial Applicability

As described above, a radio communication system and a position information providing apparatus according to the present invention are able to enhance accuracy of estimating a position of a mobile terminal, and therefore, are beneficial to radio communication such as mobile communication.

The invention claimed is:

1. A radio communication system that performs radio communication with a mobile terminal, the system comprising:
   the mobile terminal;
   a base station;
   a delay time acquiring unit configured to acquire a delay time of a signal transmitted between the mobile terminal and the base station;
   a position information acquiring unit configured to acquire a position of the base station;
   a calculating unit configured to calculate a position of the mobile terminal on the basis of the delay time acquired by the delay time acquiring unit, and the position of the base station acquired by the position information acquiring unit; and
   a providing unit configured to provide mobile station position information indicating the position of the mobile terminal, wherein
   when a predetermined exception condition is not satisfied, the providing unit provides, as the mobile station position information, the position of the mobile terminal calculated by the calculating unit, and
   when the predetermined exception condition is satisfied, the providing unit provides, as the mobile station position information, the position of the base station acquired by the position information acquiring unit, instead of using the position of the mobile terminal calculated by the calculating unit.

2. The radio communication system according to claim 1, wherein
   the predetermined exception condition is that a cover area of the base station is smaller than a predetermined area.

3. The radio communication system according to claim 1, wherein
   the predetermined exception condition is that a directivity of an antenna provided in the base station is not defined.

4. The radio communication system according to claim 1, further comprising:
   a map information storage configured to store map information which at least identifies an area where the mobile terminal may not exist, wherein
   the predetermined exception condition is that the position of the mobile terminal calculated by the calculating unit is within an area where the mobile terminal may not exist.

5. The radio communication system according to claim 1, wherein,
   after acquiring a corrected delay time by correcting the delay time in accordance with a length of a cable connecting a main body of the base station to an antenna provided in the base station, the calculating unit calculates the position of the mobile terminal by using the corrected delay time.

6. The radio communication system according to claim 1, wherein
   the mobile terminal is connected to a plurality of base stations,
   priorities are set for the plurality of base stations,
   the calculating unit calculates the position of the mobile terminal by using a position of a priority base station, for which the highest priority is set, among the plurality of base stations, and
   the providing unit provides the position of the priority base station as the mobile station position information when the predetermined exception condition is satisfied.

7. A position information providing apparatus that provides mobile station position information indicating a position of a mobile terminal, comprising:
   a receiver configured to acquire a delay time of a signal transmitted between the mobile terminal and a base station that performs radio communication with the mobile terminal;
   a position information acquiring unit configured to acquire a position of the base station;
   a calculating unit configured to calculate the position of the mobile terminal on the basis of the delay time acquired by the delay time acquiring unit, and the position of the base station acquired by the position information acquiring unit; and
   a providing unit configured to provide the mobile station position information, wherein
   when a predetermined exception condition is not satisfied, the providing unit provides, as the mobile station position information, the position of the mobile terminal calculated by the calculating unit, and
   when the predetermined exception condition is satisfied, the providing unit provides, as the mobile station position information, the position of the base station acquired by the position information acquiring unit, instead of using the position of the mobile terminal calculated by the calculating unit.

8. The position information providing apparatus according to claim 7, wherein
   the predetermined exception condition is that a cover area of the base station is smaller than a predetermined area.

9. The position information providing apparatus according to claim 7, wherein
   the predetermined exception condition is that a directivity of an antenna provided in the base station is not defined.

10. The position information providing apparatus according to claim 7, further comprising:
    a map information storage configured to store therein map information which allows at least identifying an area where the mobile terminal may not exist, wherein
    the predetermined exception condition is that the position of the mobile terminal calculated by the calculating unit is within an area where the mobile terminal may not exist.

11. The position information providing apparatus according to claim 7, wherein
    after acquiring a corrected delay time by correcting the delay time in accordance with a length of a cable connecting a main body of the base station to an antenna provided in the base station, the calculating unit calculates the position of the mobile terminal by using the corrected delay time.

12. The position information providing apparatus according to claim 7, wherein
    the mobile terminal is connected to a plurality of base stations,
    priorities are set for the plurality of base stations,
    the calculating unit calculates the position of the mobile terminal by using a position of a priority base station, for which the highest priority is set, among the plurality of base stations, and
    the providing unit provides the position of the priority base station as the mobile station position information when the predetermined exception condition is satisfied.

* * * * *